US009081269B2

(12) United States Patent
Conti (10) Patent No.: US 9,081,269 B2
(45) Date of Patent: Jul. 14, 2015

(54) LIGHTING DEVICE WITH WIRELESS MULTIMEDIA PLAYBACK MODULE (75) Inventor: Daniele Conti, Arezzo (IT)

(73) Assignees: AIDILAB S.R.L. (IT); SECO S.R.L. (IT); SOFTEC S.P.A. (IT)

( * ) Notice: Subject to any disclaimer, the term of this patent is extended or adjusted under 35 U.S.C. 154(b) by 132 days.

(21) Appl. No.: 13/634,848

(22) PCT Filed: Dec. 23, 2010

(86) PCT No.: PCT/IB2010/056056
§ 371 (c)(1),
(2), (4) Date: Sep. 13, 2012

(87) PCT Pub. No.: WO2011/117691
PCT Pub. Date: Sep. 29, 2011

(65) Prior Publication Data
US 2013/0002687 A1 Jan. 3, 2013

(30) Foreign Application Priority Data

Mar. 26, 2010 (IT) .................................. FI2010A0051

(51) Int. Cl.
G03B 21/26 (2006.01)
F21K 99/00 (2010.01)
(Continued)

(52) U.S. Cl.
CPC ................ *G03B 21/26* (2013.01); *F21K 9/135* (2013.01); *F21V 23/0435* (2013.01);
(Continued)

(58) Field of Classification Search
CPC ........ G03B 21/00; G03B 21/26; G03B 21/30; G03B 21/54; H04R 1/028; H04R 2227/03; H04R 2420/07; F21K 9/135; F21V 23/00; F21V 23/04; F21V 23/0435; F21V 23/0442; F21V 33/0052; F21V 33/0056
USPC ....................... 353/15, 29, 39, 42–43, 85, 94, 353/121–122; 362/86, 235, 362, 441, 443, 362/458
See application file for complete search history.

(56) References Cited

U.S. PATENT DOCUMENTS 2,478,336 A * 8/1949 Stein et al. ...................... 353/43
4,433,363 A * 2/1984 Weber .............................. 362/86
(Continued)

FOREIGN PATENT DOCUMENTS

CN 1 743 677 11/2005
JP 2006 011346 1/2006
(Continued)

OTHER PUBLICATIONS

PCT International Search Report mailed on Mar. 30, 2011 for PCT/IB2010/056056 filed on Dec. 23, 2010 in the name of SECO S.R.L.
(Continued)

*Primary Examiner* — Jori S Reilly-Diakun
(74) *Attorney, Agent, or Firm* — Steinfl & Bruno LLP (57) ABSTRACT A lighting device equipped with means for receiving and delivering multimedia content is described. Such a device can be mounted on any type of pre-existing standard lamp-holder so as to transform it into a sophisticated system for providing adjustable lighting and for delivering multimedia content that can be updated as desired by the user, thus being able to be integrated in a simple and cost-effective way into the room furniture without requiring the addition of other elements or the replacement of any pre-existing lighting system.

12 Claims, 5 Drawing Sheets (51) Int. Cl.
  *F21V 23/04* (2006.01)
  *F21V 33/00* (2006.01)
  F21Y 101/02 (2006.01)
  H04R 1/02 (2006.01)

(52) U.S. Cl.
  CPC ........ *F21V 23/0442* (2013.01); *F21V 33/0052* (2013.01); *F21V 33/0056* (2013.01); F21Y 2101/02 (2013.01); H04R 1/028 (2013.01); H04R 2227/003 (2013.01); H04R 2420/07 (2013.01)

(56) References Cited

U.S. PATENT DOCUMENTS

| | | | | |
|---|---|---|---|---|
| 6,748,096 B2* | 6/2004 | Chuang | ............. | 381/395 |
| 7,455,435 B2* | 11/2008 | Mathews et al. | ............. | 362/441 |
| 8,284,631 B2* | 10/2012 | Cho et al. | ............. | 368/10 |
| 8,299,903 B2* | 10/2012 | Haase et al. | ............. | 340/326 |
| 8,711,216 B2* | 4/2014 | Chien | ............. | 348/142 |
| 8,879,782 B2* | 11/2014 | Garlington et al. | ............. | 382/100 |
| 2001/0007527 A1 | 7/2001 | Lammers et al. | | |
| 2004/0264187 A1 | 12/2004 | Vanderschuit | | |
| 2005/0088631 A1 | 4/2005 | Dwyer et al. | | |
| 2006/0039570 A1 | 2/2006 | Yeh | | |
| 2006/0209268 A1 | 9/2006 | Raskar et al. | | |
| 2006/0220835 A1* | 10/2006 | Kates | ............. | 340/539.1 |
| 2007/0086199 A1 | 4/2007 | Demarest et al. | | |
| 2007/0110266 A1 | 5/2007 | Zulkowski | | |
| 2007/0211475 A1 | 9/2007 | Sevack et al. | | |
| 2009/0034778 A1* | 2/2009 | Chi | ............. | 381/394 |
| 2009/0196016 A1 | 8/2009 | Massara et al. | | |
| 2012/0106202 A1* | 5/2012 | Chien | ............. | 362/641 |
| 2013/0280985 A1* | 10/2013 | Klein | ............. | 446/297 |

FOREIGN PATENT DOCUMENTS

| | | |
|---|---|---|
| WO | 2007/128317 | 11/2007 |
| WO | 2008/153630 | 12/2008 |

OTHER PUBLICATIONS

PCT Written Opinion mailed on Mar. 30, 2011 for PCT/IB2010/056056 filed on Dec. 23, 2010 in the name of SECO S.R.L.

* cited by examiner

LIGHTING DEVICE WITH WIRELESS MULTIMEDIA PLAYBACK MODULE

CROSS REFERENCE TO RELATED APPLICATIONS

The present application is the US national stage of International Application PCT/IB2010/056056 filed on Dec. 23, 2010, which, in turn, claims priority to Italian Patent Application FI2010A000051 filed on Mar. 26, 2010.

FIELD OF THE INVENTION

The present invention refers to lighting systems, and in particular to a lighting device provided with means that make it possible to create light effects and to deliver multimedia content such as images, movies and audio.

BACKGROUND OF THE INVENTION

As known, the most recently developed lamp bulbs, and in particular LED bulbs, make it possible to control the light emission and thus the lighting of the environment changing the brightness and colour so as to allow light effects to be created that are suitable for generating particular environment atmospheres. In some cases such lamp bulbs also have the possibility of being detached from the electricity facility, but do not have standard plugs and cannot be inserted in any pre-existing lamp-holder. In other words, they operate as autonomous lighting systems and cannot act so as to enhance pre-existing lighting systems.

Systems are also known for delivering multimedia content, which use various types of projectors (for example DLP, LCD or laser projectors) combined with loudspeakers and with means for receiving the content to be delivered both through direct physical connection (for example via cable, USB ports, various types of inputs, etc.) and in wireless mode (for example Bluetooth connection, radio or infrared transmission, etc.). Even these systems generally operate as autonomous delivery systems that receive the multimedia content directly from one specific apparatus of the user (for example a photo camera or video camera) or through connection to a file storage system (for example PC or Internet).

An example of a combination between a lighting system and a multimedia content delivery system is illustrated in WO 2008/153630 which shows a miniaturised projector that is mounted on the structure of a conventional table, wall or ceiling lamp. The structure of the lamp provides the projector with mechanical support and electric power supply and can also be used as an aid to the projection, for example by exploiting the lampshade as a rear-projection screen. According to the structure of the lamp and to the surface used as projection screen, which can also be an environmental surface, the relative position of the lighting lamp bulb that and of the projector can vary so as to try to reduce their interference with each other.

Indeed, one of the most troublesome aspects of this combination, as positively indicated even in the aforementioned document, is the design of the mechanical structure which must house and link the two systems for lighting and delivering the multimedia content. To such a purpose, solutions are proposed such as masks to shield the projected image from light, mirror systems that can be oriented to reflect it onto other surfaces and also projection systems with multiple projectors or a projector with multiple outputs.

It should thus be clear that a similar combined structure is complex and costly, as well as necessarily used in addition to—or as a replacement of—a pre-existing lighting system if one desires to have a hidden broadcast system.

A lighting device is also known from the publication US2004264187 which, in the form of a common lamp bulb, includes supplementary LED lighting means, as well as audio emitting means. This is a device intended in practice only to create fancy light effects, or at the most, simple sound effects from the physical connection (wired) with an external audio signal feed.

SUMMARY OF THE INVENTION

The object of the present invention is therefore that of providing a device that overcomes the aforementioned drawbacks. Such an object is achieved by means of a device which in a structure analogous to a conventional lamp bulb with a standard plug includes the lighting and delivery functions of multimedia content.

The main advantage of the device according to the present invention is therefore that of being adapted to be mounted on any type of standard pre-existing lamp-holder so as to transform it into a sophisticated system for providing adjustable lighting and delivering multimedia content that can be updated as desired by the user. In such a way, the present device is capable of simply and cost-effectively being integrated in a room furniture without requiring the addition of other elements or the replacement of any pre-existing lighting system.

Another substantial advantage of this device, in its preferred embodiment, is that of allowing the separation of the lamp bulb containing the lighting and multimedia content delivery means from the base equipped with the standard plug to the electric power supply. In such a configuration, the device can be made temporarily independent from the electricity facility and thus portable so as to be usable in other positions or environments desired by the user.

BRIEF DESCRIPTION OF THE DRAWINGS

These and other advantages and characteristics of the device according to the present invention shall become clearer to the men skilled in the art from the following detailed description of one of its embodiments with reference to the attached drawings in which.

DESCRIPTION OF AN EMBODIMENT

Figure 1:
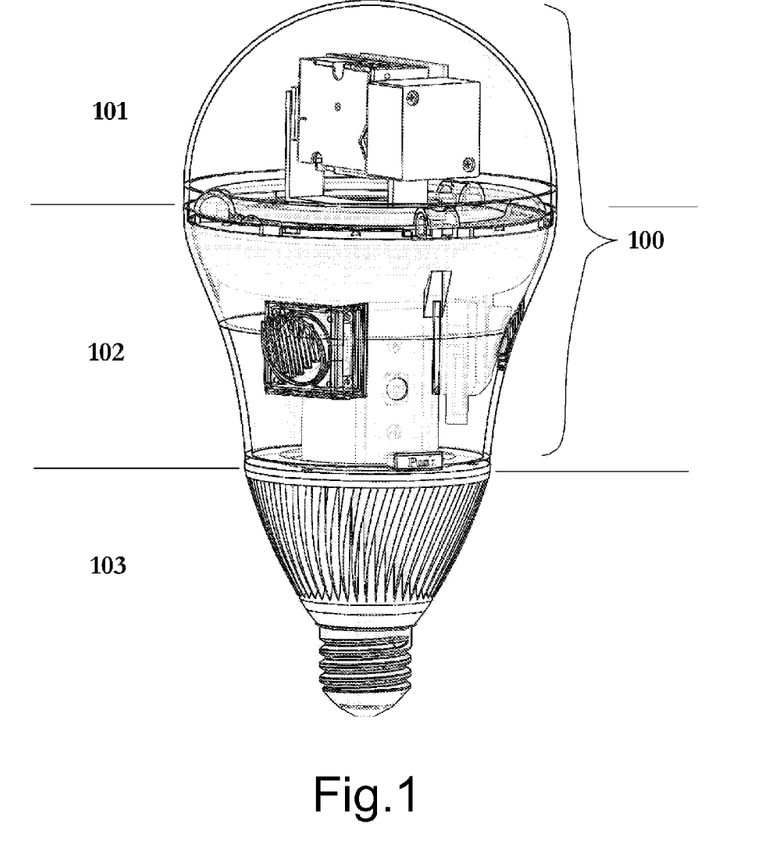
FIG. 1 is a perspective view of the device.
Figure 2:
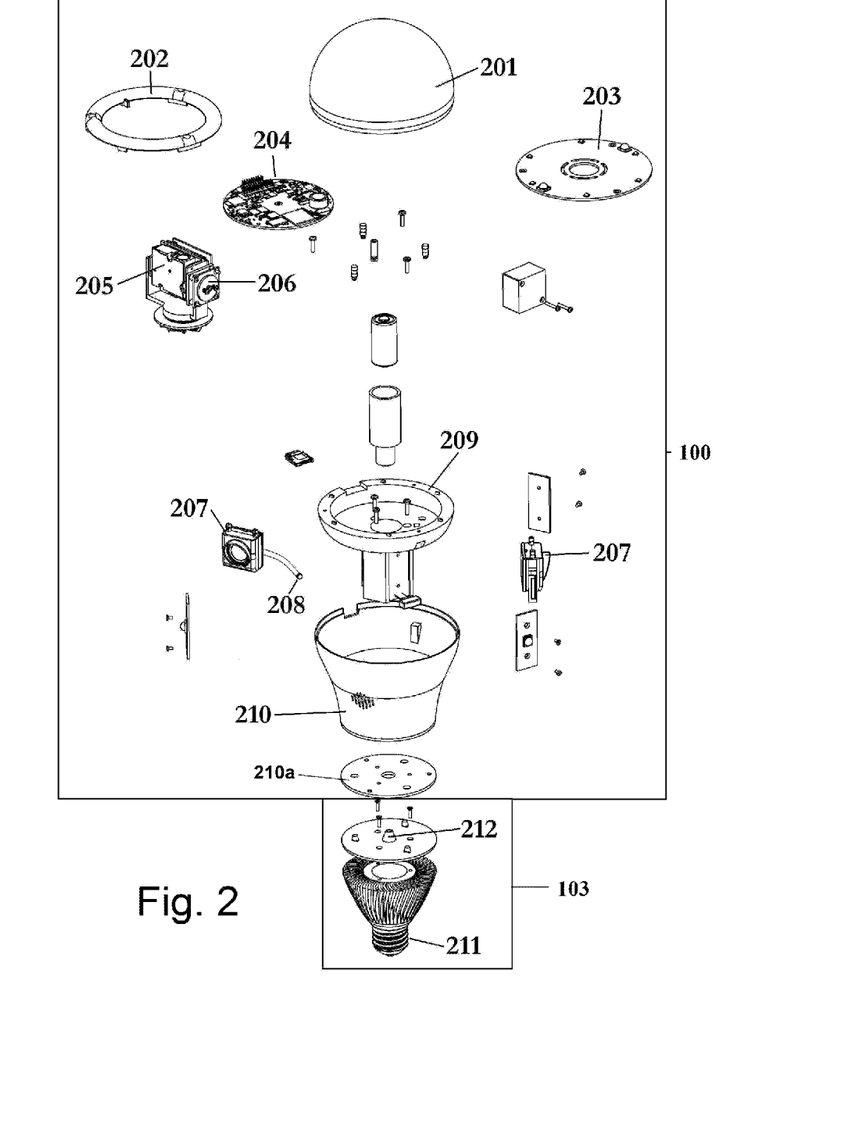
FIG. 2 is an exploded view of the device.

With reference to FIGS. 1 and 2, it can be seen that the device according to the present invention has the structure of a conventional lamp bulb light that can be divided into three main parts: a top portion 101, a central body 102 and a base 103 for connecting with the electric facility through a standard Edison-type screw plug. The top 101 and the central body 102 form the lamp bulb 100 that in the preferred modular configuration of the device can be separated from the base 103 so as to operate independently through an internal battery and/or be positioned on a table base that makes it possible to recharge it and connect it with other devices through standard ports, for example a USB port. The device is also preferably controlled through a remote control not illustrated, for example a radio frequency remote control, and the multimedia content are controlled and configured directly by the device or through a control panel on a PC or on the source of the contents.

The top portion 101 contains the elements necessary for lighting the environment with white light with low power consumption devices, for example through high brightness white LEDs. The portion 101 is conceived to contain the elements (optional in any case) for the projection of the images or movies through a projection system, for example a LED DLP, and a support and motorisation system capable of controlling the swinging of the projector according to at least two degrees of freedom, preferably also with the possibility of linear movement along at least two axes, so as to ensure a displacement control of the projection.

The central body 102 contains the main electronic means for controlling the entire device, the loudspeakers for reproducing the audio content, the communication components (for example WiFi/Bluetooth, GPRS/HSDPA), the elements necessary for obtaining the coloured environment lighting (for example low power consumption RGB LEDs), and preferably an internal rechargeable electric power source for the functioning of the device without external electrical power supply. In this part of the device there can also be one or more microphones and a webcam.

The base 103, suitable for connection with normal lighting apparatuses through a standard plug, contains all the electronics necessary for converting the power supply voltage from the electricity facility into an ultra low voltage power supply, sufficient for supplying power to—and for recharging—the lamp bulb above it and protects the user from the risk of electrocution. This is important in particular in the preferred embodiment that permits the separation of the lamp bulb 100 from the base 103 allowing it to be portable. It should be noted that although the illustrated embodiment comprises an Edison-type screw plug, any other type of standard plug can work just as well and the device can also, and advantageously, be provided with different interchangeable bases 103 with different plugs according to the lighting system in which it must be integrated.

The device thus provides for four main operation modalities:

a) low power consumption white light environment lighting with brightness adjustment;

b) low power consumption coloured light environment lighting, for example of the RGB type, which makes it possible to deliver light of various colours and brightness, with control of environmental atmospheres based on colour scales which can be configured and stored in the device and with the possibility of associating the contents with particular colour scales;

c) projection of images and movies for the visualisation of web services (for example YouTube®, Facebook®, Flickr®, etc.) through a dedicated interface with widgets, environmental atmospheres, digital content sent by the user to the device or from personal networks;

d) playing audio files for enjoying audio content loaded by the user, from the Internet (for example web radio, podcasts, etc.), audio surveillance and the like with the possibility of combining light effects with the sound played.

The exploded view of FIG. 2 makes it possible to appreciate in greater detail the main elements of the device that can be described as follows:

a covering dome 201 which allows for the projection of the visual content and the lighting with white light, and is therefore made with a transparent insulating material typically like glass or plastic;

a convex ring 202 that makes it possible to effectively diffuse white light thanks to its opaque surface and to the positioning with respect to the white light lighting elements;

an upper electronic circuit 203 on which both the low power consumption white light lighting elements (for example high brightness white LEDs), with relative electronic control means, and the controls of the motorisation of the projector are applied;

a lower electronic circuit 204 containing the actual on-board intelligence, i.e. the microprocessor/microcontroller system capable of carrying out all the necessary processing for the device, as shall be made clearer hereafter;

a projector 205 mounted on a suitable support capable of rotating on the three axes, so as to make it possible to project the visual content on one external surface, and provided with an adjustment system, which can be controlled remotely, for adjusting the focus of the image so as to make it possible to display the images on surfaces at variable distances;

a motorisation system 206 capable of managing the rotation on the three axes of the projector 205, so as to allow for a projection with many spatial orientations and ensure that all the various orientations in any case ensure the maximum effectiveness in delivering white light from the lighting elements;

two or more loudspeakers 207, or analogous devices for acoustic delivery, with suitable power equipped with a sound box, for the stereophonic delivery of audio content;

a microphone 208, or analogous audio input device, for capturing and/or recording external audio sources (for example environmental sounds, electronic audio sources, etc.);

a main body 209 that houses the rechargeable battery, for the operation of the device without external electrical power supply, and the coloured environment lighting elements, typically RGB LEDs;

a protective shell 210 made from insulating and semitransparent material, made opaque so as to ensure the correct environment delivery of coloured light from the main body 209 as well as perforated at the loudspeakers 207 and at the microphone 208 so as to permit the correct acoustic delivery from and towards outside the device. At the bottom, the shell 210 is preferably closed with a flat base 210a so as to allow, in the case in which the lamp bulb 100 is detached from the power supply base 103, the safe transportability of the lamp bulb 100 and its vertical positioning on flat surfaces, for example above a table.

a power supply base 103 suitable for connecting with normal lighting apparatuses through a standard plug 211 (an Edison screw plug in the illustrated example) and containing the elements for converting the power supply voltage from the voltage of the electricity facility to the voltage necessary for recharging the rechargeable battery contained in the main body 209 and for the operation of the entire device. The electric connection between the AC-DC group (103) and the top part of the lamp (100) can be ensured by spring contacts, sliding contacts, or the like, according to the type of connection between the two parts which can be of the bayonet type, of the direct coupling type or equivalent types. The connector 212 is coupled inside the main body to its complementary matching element, equipped with electrical contacts suitable for bringing the power supply directly to the top electronic group. The voltage transferred to the rest of the device through an upper connector 212 is in the range defined for the ultra low voltage so as to not create electrical risks for the end consumer. Except for said connector 212 and the plug 211 that realizes the electric connection with the lighting system, the rest of the shell of the base 103 is produced with insulating and non-transparent material, for example ceramic material, so as to ensure the safety insulation from the power supply electricity facility.

Figure 3:
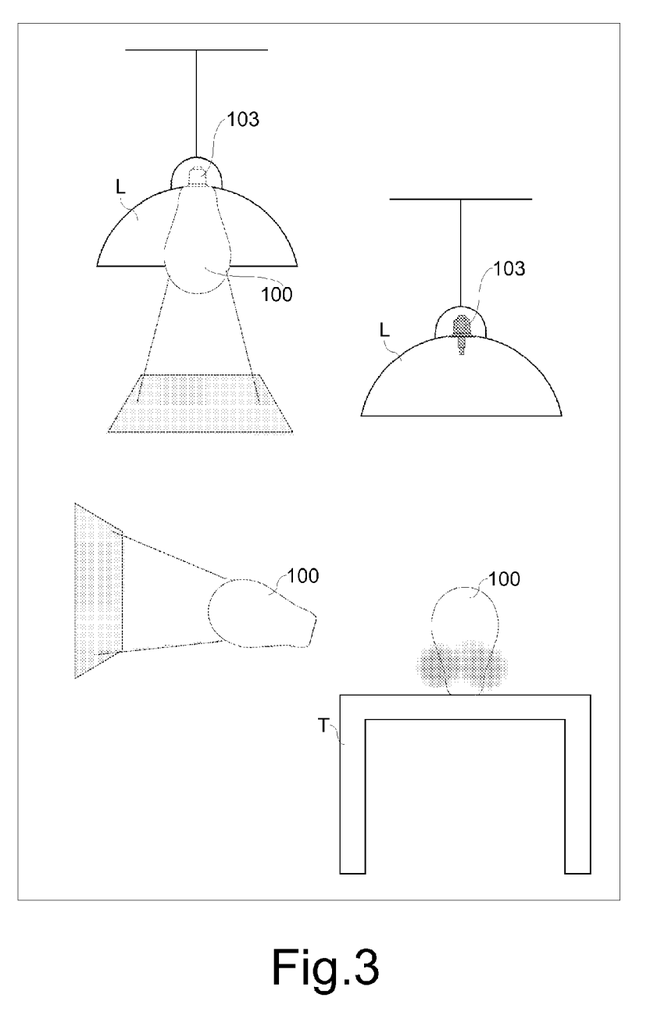
FIG. 3 is a schematic visualisation of some ways of positioning the device.

FIG. 3 schematically represents some modalities of use of the device in its modular version, in which the internal battery allows the lamp bulb 100 to be detached from the power supply base 103. In the top left view the device is mounted on a ceiling light L so as to project the visual content on a horizontal surface (for example the floor), but for other uses the lamp bulb 100 can be removed leaving only the base 103 on the ceiling light L as shown in the top right view. Once it has been removed from the base 103, the lamp bulb 100 can be positioned in any place and used for the projection of visual content on a wall (bottom left view) or as coloured light environment lighting, for example resting it on a table T (bottom right view), and so on.

The lamp bulb 100 can then be repositioned simply on its power supply base 103 through a bayonet coupling, making it possible to recharge the internal battery and to ensure a normal work mode. The lamp bulb 100 could also be positioned on a special base, not illustrated, which can be used both for supplying it with power and for connecting it via cable or in wireless mode with other devices (for example a PC).

Figure 4:
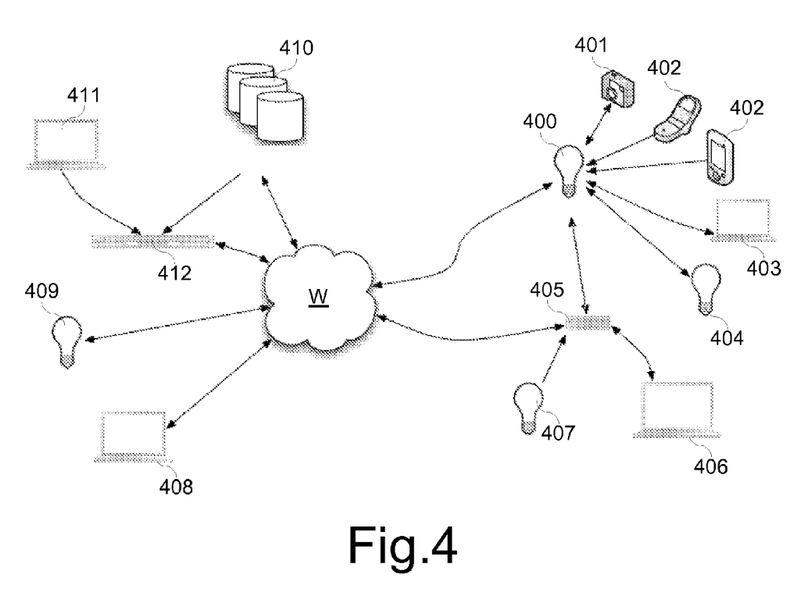
FIG. 4 is a schematic visualisation of the flow of the multimedia content from the various possible sources to the device.

FIG. 4 schematically represents the flow of the content from various sources towards the device, the sources of content represented in the figure being only given as a non exhaustive indication.

A device 400 can share content with local devices that can be reached directly through a personal area network (PAN), for example content from a photo camera/video camera 401, from mobile devices 402, from a portable PC 403 or from another analogous compatible device 404 present in the same environment as the device 400. The sharing of content can also occur with devices that can be reached through a local network 405, for example a home network, such as a personal computer 406 or another compatible device 407 present in environments adjacent to that of the device 400.

Moreover, the device 400 can also share content with remote devices that can be reached through the web W, such as a personal computer 408 or another compatible device 409 present in remote environments. In order to exploit the services 410 of management and publication of the content made available on the web W or the content stored in other personal computers 411 connected to the web W, it can be necessary to make the content pass through a server 412 that processes the same content so as to make them compatible with the characteristics of the device 400.

In the case in which the device 400 shares content with one or more local devices 404, 407 also a participating sharing modality is provided for, so that all the devices contribute in a cooperative manner to the content usage. For example, each device participates in the reproduction of the content providing its contribution to the scene through coloured lights. In the case of sharing with a remote device 409, also a synchronising modality of the content usage can be provided for.

Figure 5:
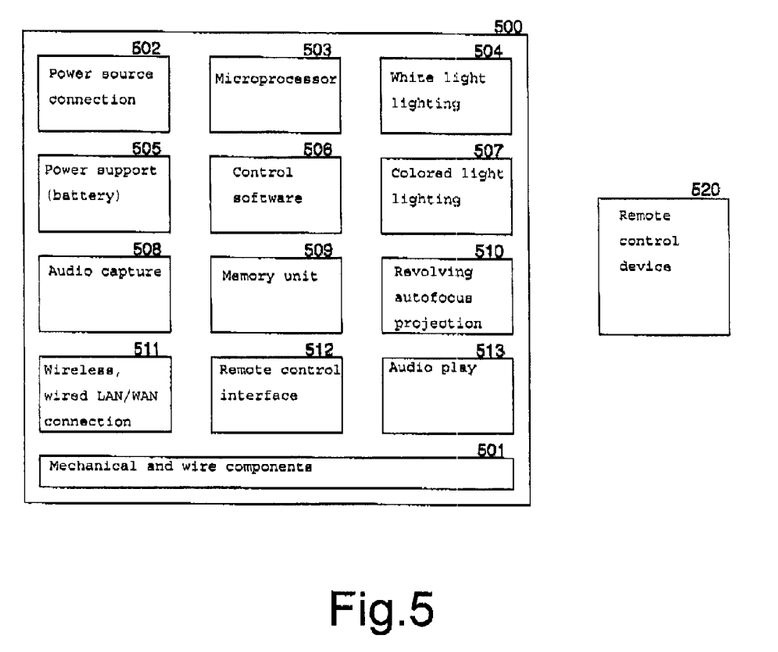
FIG. 5 is a schematic visualisation of the main logic elements used for controlling and operating the device.

The main logical components of the present device are finally schematically represented in FIG. 5 and are described in brief as follows:

mechanical components and cables 501 that constitute the main structure of the device 500;

a connector 502 for the connection of the device to the energy source, i.e. the electricity facility or the internal battery 505;

a microprocessor 503 for running the device controlling and managing software 506;

white light sources 504 for operation as conventional lighting lamp;

a rechargeable battery 505 for the operation of the device when it is not connected to the power supply facility;

an advanced software 506 that controls the device, reproduces the content, interfaces with the various elements of the device;

coloured light sources 507 for the operation as furniture lamp and create environment atmospheres;

an audio input 508 that may comprise a connector for audio capturing, for example of the S/P-DIF type, and/or a high sensitivity microphone for controlling the device vocally;

a memory unit 509 for running the software 506 (for example on a flash type support) and for storing the content to be used through the device (for example on a RAM flash or removable type support);

a projector 510 of images or movies, for example of the DLP, LCD or laser type;

modules 511 for the connection of the device via cable or wirelessly to a network that can be both LAN (for example local) and WAN;

an interface 512 for the signals of the remote control 520, for example of the radio frequency or infrared type;

two or more loudspeakers 513 for playing the audio content, for example music tracks;

a remote control 520, for example of the radio frequency or infrared type or of another type with equivalent technology, for controlling the device 500 from a distance, suitable for controlling the light effects, the movement of the projector and for allowing the navigation in the control system of the device, thus accessing the relative functionalities.

The modules 511 can include communication components that allow for the device to receive and transmit signals over telecommunication networks with various modalities, such as Internet Protocol (IP)-based communication on Wireless Local Area Network (WLAN) networks, Global System for Mobile (GSM), Code/Time Division Multiple Access (CDMA/TDMA), 3rd Generation (3G) such as GPRS/EGPRS, EDGE, UMTS, HSDPA or other telecommunication networks. The integration of these modules 511 in the lamp bulb 100 enhances the device according to the invention with the possibility of always being connected even in places without wired Internet connection. The communication can occur even through Power Line Communication technologies, which make it possible to transfer data through the electric power supply network.

The device includes a routing component that automatically redirects the content and the controls to the different reproduction components, a real-time communication component (for example hardware and/or software for audio and/or video communication, hardware and/or software for text messaging or instantaneous messages), as well as a component of the browser type that redirects the content on HTTP protocol or on other supported protocols (FTP, SSH, RSS, UDP, etc.).

The device can also include sensors that allow for many interaction modalities such as those coming from light and sound environmental changes and from gestural and vocal interactions of the user in the proximity of the device. These are enabled by the sensors that can be present in the device, like for example the microphone, an image sensor, an infrared sensor, an ultrasound sensor, a brightness sensor and so on.

The integration of a microphone and/or of one or more sensors permits the device to interact with the surrounding environment for numerous applications like, for example, baby or elderly people watch, voice recognition to activate specific functions, etc.

It should be clear that the embodiment of the device according to the invention described and illustrated above constitutes only an example that can undergo numerous variations. In particular, white and/or coloured light sources can be of a type different from the aforementioned LEDs, and the possible coupling means between the base 103 and the lamp bulb 100 can be different from the bayonet coupling described above.

Similarly, the shape of the device that copies that of a light bulb lamp should be intended only as a preferred embodiment and other embodiments can be foreseen as long as the general structure of the device is maintained. Possible additions and/or modifications can thus be brought to the device of the present invention without however departing from the scope of protection thereof.

The invention claimed is:

1. A device comprising:
   multimedia content playback means, wherein the multimedia content playback means receives internet content and comprises an image projector supported by a motorised swinging system with at least two degrees of freedom;
   communication means suitable for receiving said internet content in a wireless manner;
   control means for said playback means, suitable for processing and transmitting said internet content received by said communication means and including integrated memory components;
   environment lighting means;
   electric power supply means; and
   electronic means for converting the power supply voltage from an electricity facility into a low voltage power supply; wherein the device further comprises:
   a lamp bulb portion divided into a top portion wherein at least white light lighting means of said environment lighting means are contained,
   a central body wherein said communication means, control means and playback means are contained, and a base including said power supply means and integrally equipped with a standard plug configured to be mounted on a standard lamp socket of a lamp holder of a lighting apparatus.

2. The device according to claim 1, wherein said central body also comprises an internal rechargeable power electric source for operation of the device without external electrical power supply.

3. The device according to claim 2, wherein the central body comprises a main body that houses the internal rechargeable electric power source and coloured light lighting elements of said environment lighting means.

4. The device according to claim 1, further comprising reversible coupling means between said central body and said base, adapted to make said lamp bulb removable from said base and usable independently or for being connected to external power supply means, configured to couple with said coupling means.

5. The device according to claim 4, further comprising, or being associable with, a table base comprising said external power supply means, said base being adapted to recharge and/or supply power to the lamp bulb and for allowing the lamp bulb to be connected to other devices through standard ports.

6. The device according to claim 4, wherein the lamp bulb is closed downwards by a flat base.

7. The device according to claim 1, wherein the central body comprises one or more microphones and/or a webcam.

8. The device according to claim 1, wherein said image projector is supported by a motorised system so as to be movable along at least two axes so as to allow for spatial displacement of the projection.

9. The device according to claim 1, further comprising a remote control suitable for controlling the light effects, the movement of the image projector and for navigation of the control system of the device, thus accessing the relative functions of the control system of the device.

10. The device according to claim 1, wherein said control means comprise a CPU system and an input/output controller for the dynamic and programmable management of the content, managed by an advanced operating system.

11. The device according to claim 1, further comprising modules for cable or wireless connection in one or more of the following ways: WiFi/Bluetooth, IP-based communication on Wireless Local Area Network (WLAN) networks, Global System for Mobile (GSM), Code/Time Division Multiple Access (CDMA/TDMA), GPRS/EGPRS, EDGE, UMTS, HSDPA or Power Line Communication.

12. The device according to claim 1, further comprising sensors configured to detect light and sound environmental changes and gestural and vocal interactions of the user in proximity of the device, wherein the sensors comprise an image sensor, an infrared sensor, an ultrasound sensor or a brightness sensor.

* * * * *